United States Patent [19]

Watanabe

[11] Patent Number: 5,016,045
[45] Date of Patent: May 14, 1991

[54] IMAGE READING APPARATUS

[75] Inventor: Yoshio Watanabe, Kanagawa, Japan

[73] Assignee: Kabushiki Kaisha Toshiba, Kawasaki, Japan

[21] Appl. No.: 428,921

[22] Filed: Oct. 30, 1989

[30] Foreign Application Priority Data

Oct. 31, 1988 [JP] Japan .................................. 63-275196

[51] Int. Cl.⁵ .............................................. G03B 27/52
[52] U.S. Cl. .......................................... 355/43; 355/66; 355/45
[58] Field of Search ..................................... 355/43–45, 355/60, 66, 72, 46

[56] References Cited

U.S. PATENT DOCUMENTS

| 2,927,503 | 3/1960 | Zollinger | 355/60 |
| 4,066,357 | 1/1978 | Mori | 355/66 |
| 4,636,062 | 1/1987 | Ohno et al. | 355/43 |

Primary Examiner—L. T. Hix
Assistant Examiner—D. Rutledge
Attorney, Agent, or Firm—Foley & Lardner, Schwartz, Jeffery, Schwaab, Mack, Blumenthal & Evans

[57] ABSTRACT

An image reading apparatus is provided which comprises an original table cover having an image projection window, and a lid member having a reflector on the inner surface thereof, movably attached to the original table cover. Image projection light from a projector placed on the original table cover is reflected by the reflector on the lid member, and focused on a glass original table.

7 Claims, 6 Drawing Sheets

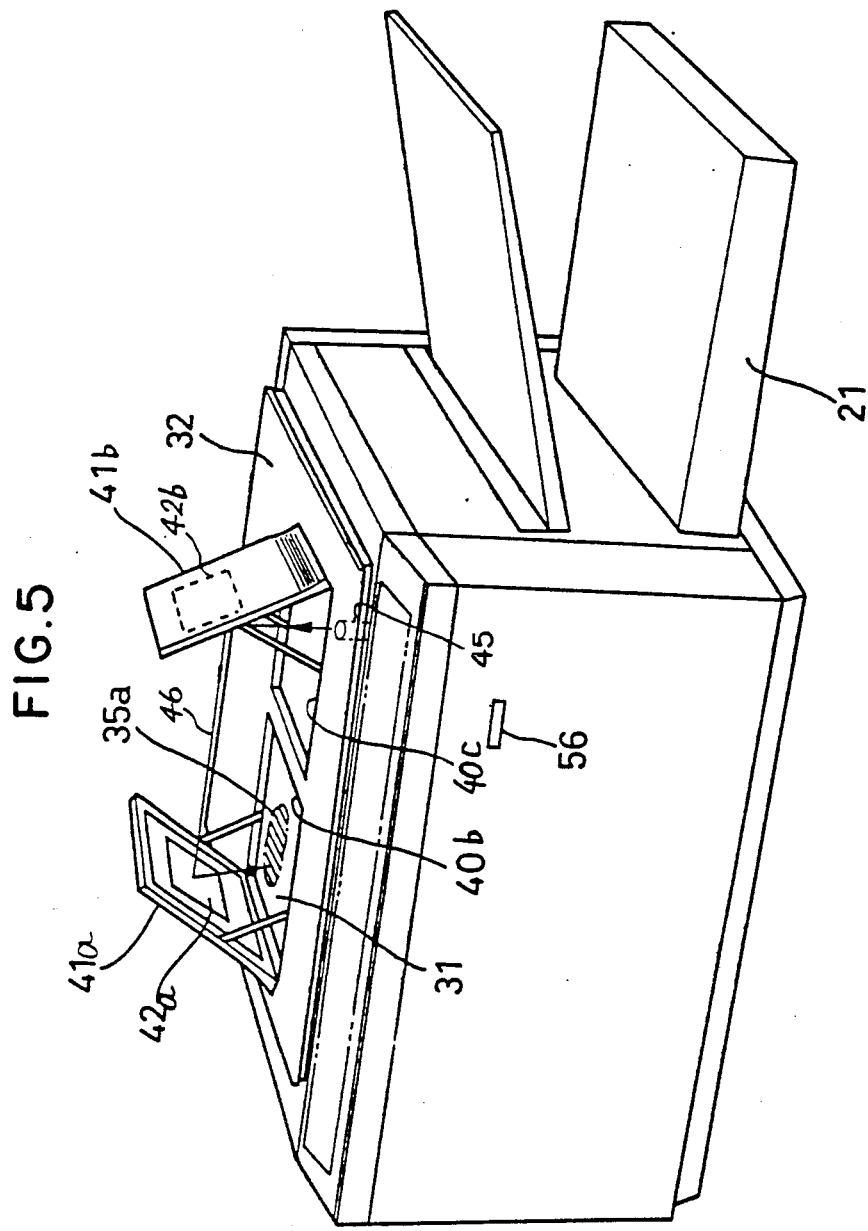

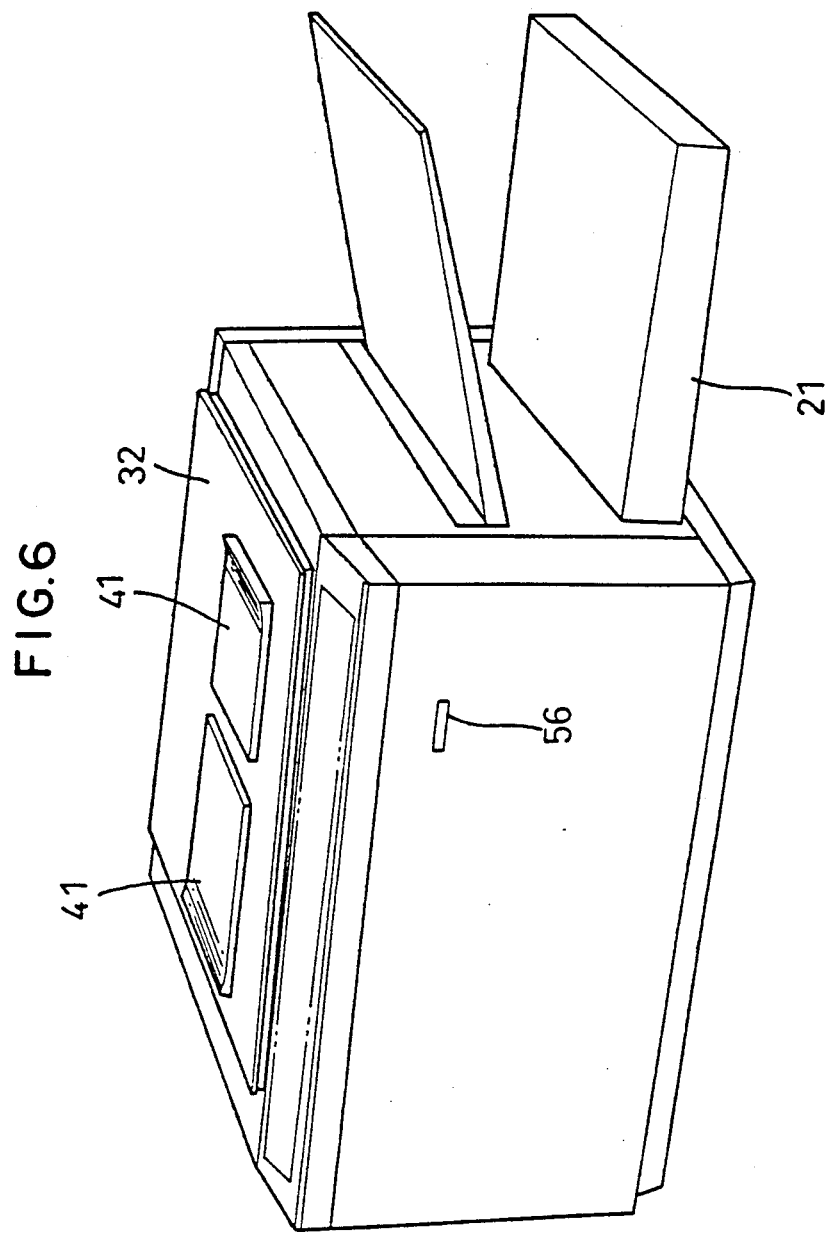

IMAGE READING APPARATUS

BACKGROUND OF THE INVENTION

1. Field of the Invention

This invention relates to an image reading apparatus for use in a thermal transfer-type copying machine, and more particularly to an image reading apparatus for reading an image projected from a transparent original.

2. Description of the Related Art

In general a thermal transfer-type copying machine comprises an image reading apparatus that reads an original image and converts the same into electric signals. Further, the machine comprises a signal processing unit that processes the thus converted image signals in a prescribed manner. The machine further comprises a printer unit that prints a desired image on a sheet in accordance with information based on the thus processed image signal. A conventional image reading apparatus is provided in the upper portion of a thermal transfer-type copying machine. The image reading apparatus comprises an original table made of glass, an original table cover that covers or exposes the glass original table, and image reading means provided under the original table. The image reading means reads the image of an original set on the glass original table 3, and converts the same into electric signals.

An adapter has a reflector, a projection opening, and a projector. These are used when the image on a transparent original, such as a developed positive film, is copied. Image projection light from the projector is reflected downward by the reflector Thus, the image on a film original is projected and focused on the original table. The thus focused image is converted by the image reading means into electric signals. Thereafter, a desired image is formed on a sheet using techniques well known to those skilled in the art.

In the above-described conventional image reading apparatus, the adapter having a reflector and projection opening is simply placed on the glass original table. Thus, the optical axis of the reflector will inevitably be shifted by even a small external force on the machine. In addition, the image on a film is read with the original cover left open. Thus, stray light can easily penetrate into the projection opening. Moreover various kinds of projectors may be placed on the glass original table for image projection, potentially resulting in the damage of table.

SUMMARY OF THE INVENTION

Accordingly, one object of this invention is to provide an image reading apparatus having a particular original table cover. The cover serves to securely support a reflector that reflects image projection light from a projector placed on the cover. The cover also reduces stray light penetration, and protects the glass original table from damage.

Briefly, in accordance with one aspect of this invention, there is provided an image reading apparatus which comprises an original table cover having an image projection window, and a lid member having one end being engaged with the original table cover for freely opening and closing the image projection window the lid member having a reflector on the inner surface thereof for reflecting the projected image toward the original table.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a perspective view illustrating a second embodiment, according to the present invention, when in use; and FIG. 6 is a perspective view illustrating the second embodiment, according to the present invention, when not in use.

DESCRIPTION OF THE PREFERRED EMBODIMENTS

Figure 1:
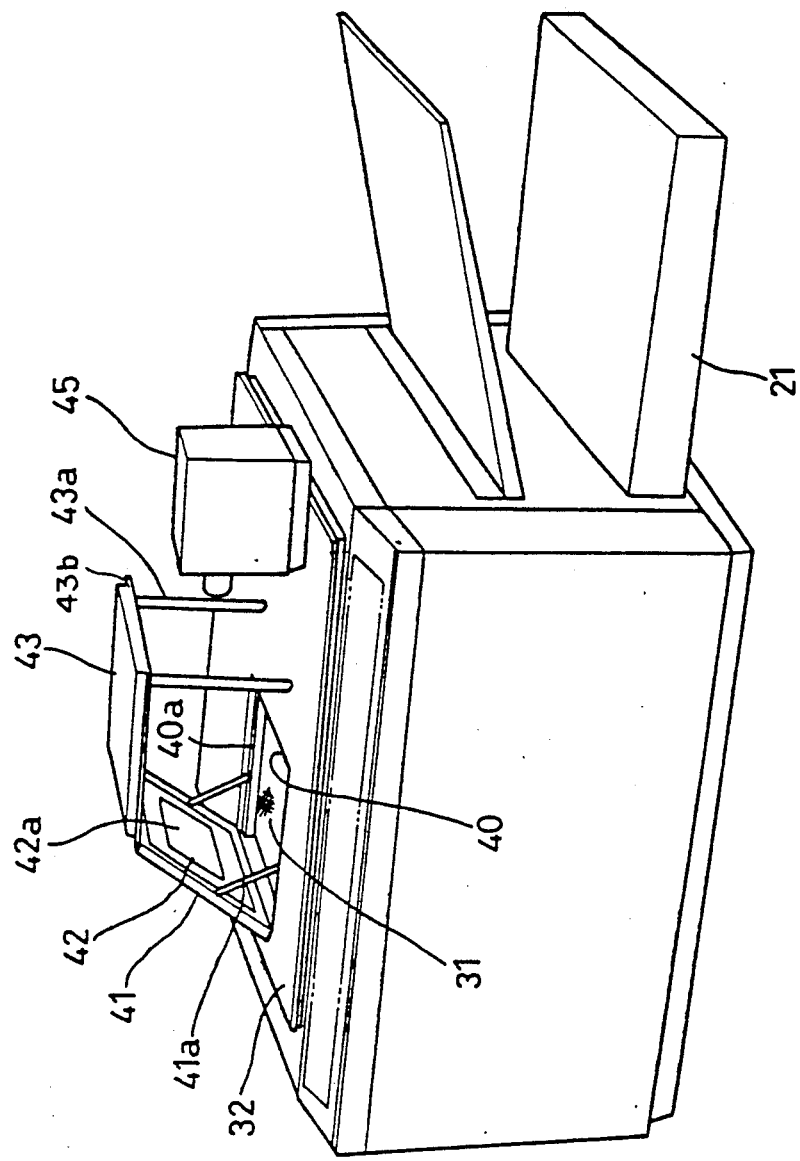
FIG. 1 is a perspective view illustrating a first embodiment according to the present invention when in use.

Referring now to the drawings, wherein like reference numerals designate identical or corresponding parts throughout the several views, and more particularly to FIG. 1 thereof, a first embodiment of this invention will be described.

Figure 2:
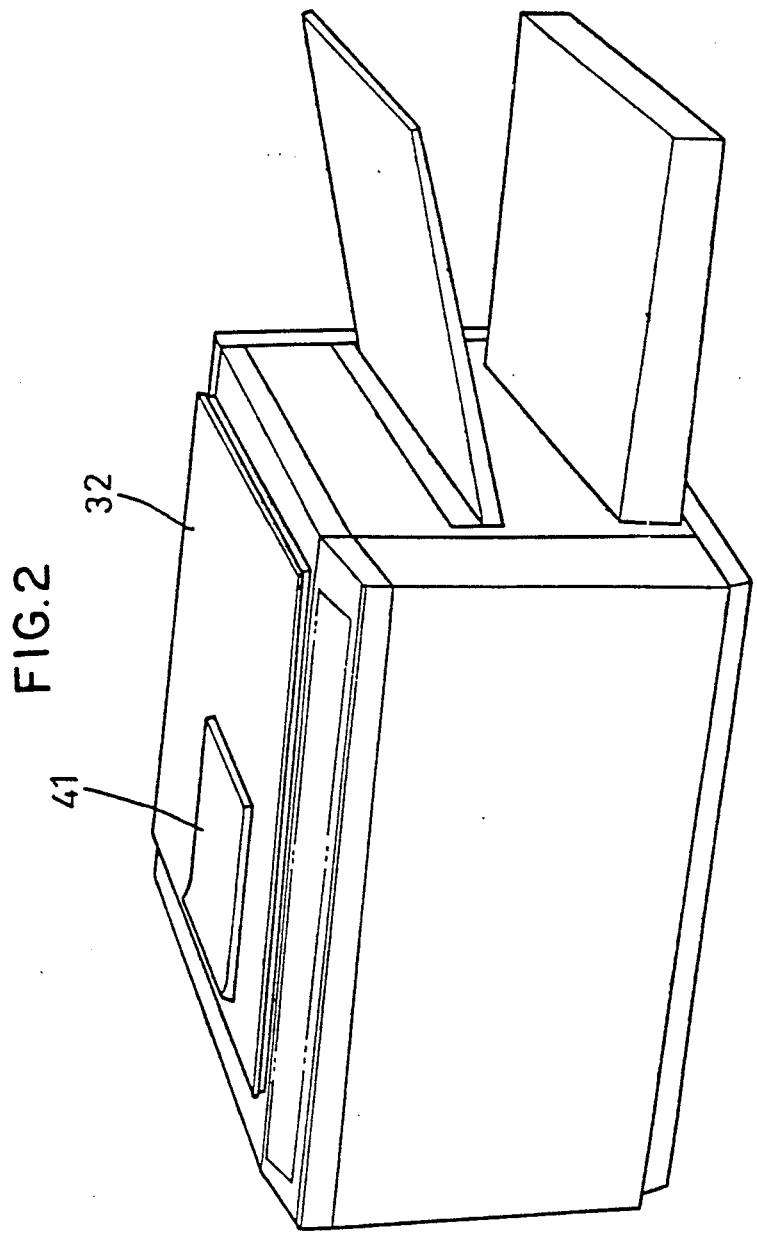
FIG. 2 is a perspective view illustrating the first embodiment, according to the present invention, when not in use.
Figure 3:
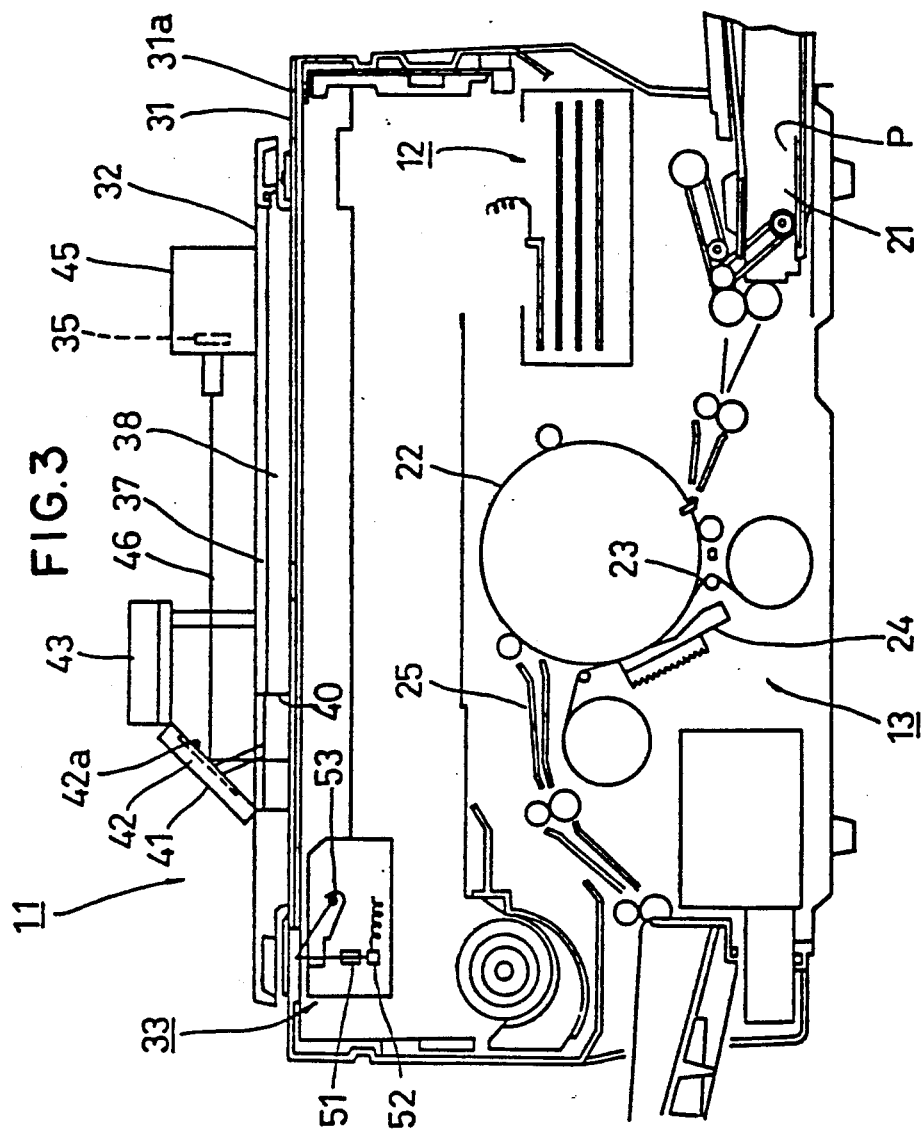
FIG. 3 is a schematic cross-sectional view illustrating an overall configuration of a color copying machine employing the first embodiment of the present invention.

First, a schematic configuration of a thermal transfer-type copying machine will be described with reference to FIGS. 1 through 4. In FIG. 3, the thermal transfer-type copying machine comprises an image reading apparatus 11, a signal processing apparatus 12 and a printer apparatus 13. The image reading apparatus 11 represents a first embodiment according to the present invention. The image reading apparatus 11, which will be later described in detail, reads an image projected from a projector 45 and converts the same into electric signals.

The signal processing apparatus 12 operates in the same manner as that of a conventional counterpart. Specifically, the apparatus 12 comprises a color conversion unit and a memory unit. The color conversion unit receives color signals such as green, yellow and cyan from the image reading apparatus 11, and converts the same into color signals such as magenta, yellow and cyan. The memory unit stores the thus converted color signals, and outputs control signals to the printer apparatus 13 so as to form a desired image on a sheet. This is performed in the same manner as in the conventional counterpart, thus a detailed description thereof will be omitted.

The printer apparatus 13, which is also the same as one found in a conventional counterpart, will be briefly described. The printer apparatus 13 comprises a paper supply unit 21 that supplies sheets P, and a platen drum 22 that rotates winding a sheet P around the outer circumference thereof. Further, the apparatus 13 comprises an ink ribbon 23 being wound by one roller from the other roller along the outer circumference of the platen drum 22, a thermal head 24 that opposes the platen drum 22 interposing the ink ribbon 23 therebetween, and a paper discharge unit 25.

The image reading apparatus 11 comprises an original table 31, an original table cover 32 and an image reading means 33. The original table 3; is made of a glass plate, and the projection image from a transparent original 35 set in the projector 45 is focused on the glass original table 31. The original table cover 32 is mounted on the original table 31 so as to be freely opened/closed. Thus, the original table 31 can be shielded from or opened to light. The cover 32 comprises a pressing plate 37 and a pressing pad 38, and these are used when the image on an opaque original is copied. Specifically, the plate 37 and pad 38 serve to achieve the close contact between the opaque original and the original table 31. The original table cover 32 comprises a projection window 40, which is an opening through both the upper and lower surfaces of the cover 32. On both sides of the window 40, step portions 40a are formed, as shown in FIG. 1. A lid member 41 is mounted on the window 40 so as to be freely opened and closed. Thus, the projection window 40 can be shielded from or opened to light. A reflector 42 is attached to the inner surface of the lid member 41. A protective pad 43 is attached to the upper end of the lid member 41 on hinges. Thus, the protective pad 43 can be moved up to a position to cover the reflector 42 to protect it from stray light. The lid member 41 has two support levers 41a, each end of which is rotatably attached to a portion close to the reflector 42. The other ends of the support levers 41a are engaged with the step portions 40a when in use. As a result, the reflector 42 is supported maintaining an inclination of about 45 degrees. Further, the protective pad 43 is supported by support members 43a at a position substantially horizontal with respect to the machine level. As a result, the penetration of stray light can be reduced.

In the case when a projector is not used, i.e., when the image on an opaque original is copied, the protective pad 43 and support members 43a are collapsed, and put back the inner surface of the lid member 41. Next, the support levers 41a are disengaged from the step portions 40a, and put back in grooves (not shown) provided along the reflector 42. Thereafter, the lid member 41 and the protective pad 43 which have been united, one may close the window 40, as shown in FIG. 2. In this case, brim portions 43b of the protective pad 43 come in touch with the step portions 40a. The plane of protective pad 43, which comes in contact with the original table 31, is made of the same material as that of the original table cover 32. Specifically, the plane is made of a cushion material to which a vinyl chloride film is adhered and the surface thereof is processed with fluorocarbon polymers.

Figure 4:
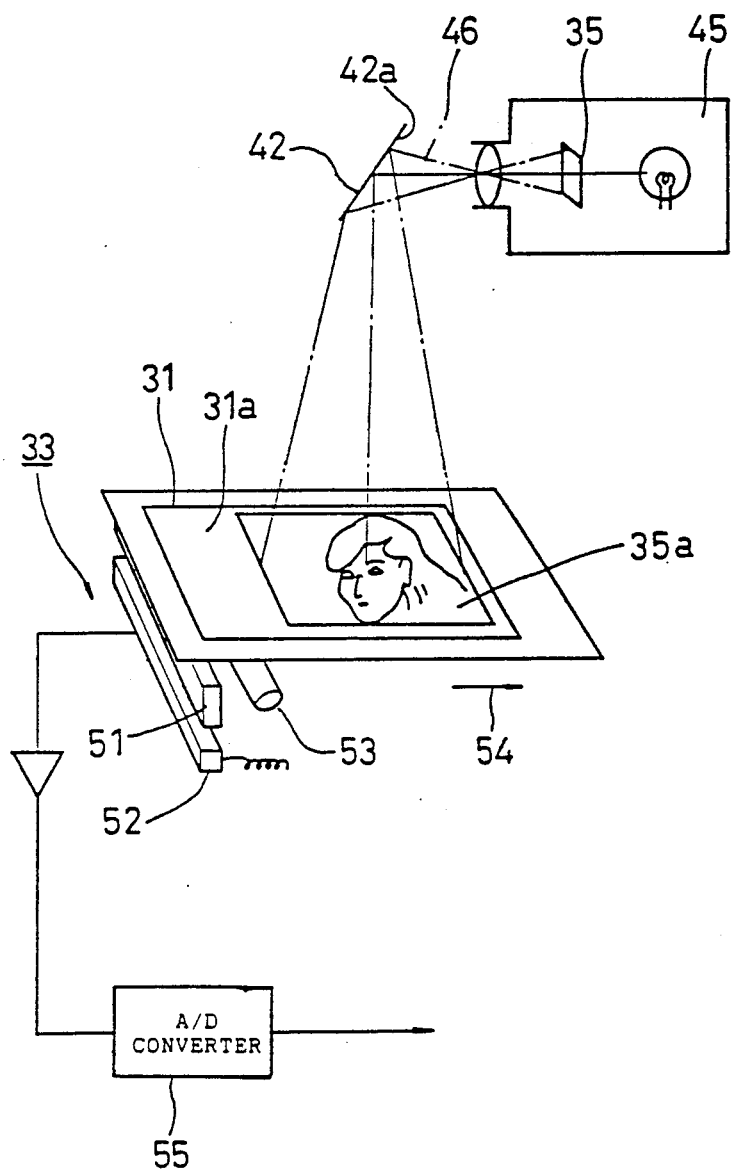
FIG. 4 is a schematic diagram explaining the operation of the first embodiment according to the present invention.

Next, the image reading means 33 will be described with reference to FIGS. 3 and 4. The image reading means 33 provided immediately under the original table 31 is moved by a drive mechanism (not shown) from the left to the right, as shown in FIG. 3. The image reading means 33 comprises a lens unit 51, a photoelectric transducer 52 and an illumination light source 53. FIG. 4 is a schematic diagram illustrating an essential portion of the image reading means 33 for explaining the operation thereof. In FIG. 4, the projector 45 placed on the original table cover 32 projects light through the image on the transparent original 35. The thus projected light 46 is reflected by a reflector 42 and focused on the original table 31 so as to form a projected image 35a. In this case, the illumination light source 53 is turned off when the operator selects the transparency copy mode. The image reading means 33 is moved in the direction of the arrow 54 for scanning the projected image 35a as follows. Specifically, the projected image 35a is focused by the lens unit 51 on the photoelectric transducer 52. The thus focused image 35a is converted into electric signals by main- and sub-scanning procedures. These converted signals are fed into an A/D (analog-to-digital) converter 55, which, in turn, provides digital signals to the signal processing apparatus 12.

Next, the overall operation of the thermal transfer-type copying machine in which a first embodiment of this invention is employed will be described.

First, the lid member 41 is closed, as shown in FIG. 2. Second, the lid member 41 is opened and positioned at a prescribed angle by the use of support levers 41a, as shown in FIG. 1. Next, the protective pad 43 is moved on hinges, and supported by the support members 43a at a position substantially horizontal with respect to the machine level. When the projector 45 projects light through the image on the transparent original 35, the image projection light 46 is reflected by the reflector 42. The reflected image is focused on the focus plane 31a of the original table 31, as shown in FIG. 4. The thus focused image 35a is converted by the photoelectric transducer 52 into electric signals. The electric signals are further converted into digital signals by the A/D converter 55, and fed into the signal processing apparatus 12 of FIG. 3. The apparatus 12 processes the received digital signals and outputs the thus processed signals to the printer apparatus 13.

When an image is to be printed, a sheet p is supplied from a paper supply unit 21, and the leading end of the sheet P is gripped by a gripper of the platen drum 22. The platen drum 22 then finds the sheet P, while rotating. Next, when the sheet P reaches a position opposing a thermal head 24, the thermal head 24 presses an ink ribbon 23 against the sheet P to begin the thermal transfer process. The thermal transfer process is performed in accordance with electric signals produced from the signal processing apparatus 12. To form a three-color image, for example, such thermal transfer proceses are preformed three times overlaying three different colors on the sheet P while the platen drum 22 rotates three times. After the completion of the thermal transfer process the platen drum 22 rotates in the opposite direction. As a result, the sheet P is discharged through a paper discharge unit 25.

In the case when the image on an opaque original is to be copied, the lid member 41 is closed. The opaque original is depressed by the protective pad 43 which is united with the lid member 41. The illumination light source 53 is turned on, and moved from the left to right illuminating the opaque original so as to achieve image scanning.

Next, a second embodiment according to the present invention will be described with reference to FIGS. 5 and 6. In this embodiment, a projector is incorporated in a thermal transfer-type copying machine. In FIG. 5, two image projection windows 40b and 40c are provided in an original table cover 32. Two lid members 41a and 41b are rotatably attached to the original table cover 32 at positions corresponding to the image projection windows 40b and 40c. Two reflectors 42a and 42b are provided on the respective inner surfaces of the lid members 41a and 41b. Image projection light 46 from the incorporated projector 45 is reflected twice by the reflectors 42b and 42a, and then focused on a glass original table 31. As a result, a projected image 35a on a transparent original 35 set in the projector 45 is focused on the original table 31. An opening 56 provided in the front side of the machine is used for handling the original 35. Other features of this embodiment are the same as those in the first embodiment, and thus the description thereof will be omitted.

In the first and second embodiments, an image reading apparatus for use in a thermal transfer-type copying machine has been described. However, this invention is not limited to this configuration. This invention may also be applied to any image reading apparatus of any configuration with an original table and an original table cover.

As described above, an image reading apparatus according to the present invention has the following advantages. Specifically, a reflector can be positioned quickly and accurately. Further, the reflector is securely fixed to an original table cover, thus resulting in a stable optical axis. This significantly enhances the operation efficiency of a thermal transfer-type copying machine. Moreover, copying operations can be performed with the original table cover closed. Thus, the penetration of stray light can be effectively reduced. Further, the original table is free from damage which may be caused by a projector.

Obviously, numerous additional modifications and variations of the present invention are possible in light of the above teachings. It is therefore to be understood that within the scope of the appended claims, the invention may be practiced otherwise than as specifically described herein.

What is claimed is:

1. An image reading apparatus, comprising:
   an original table provided with an image focusing plane for focusing thereon an image projected from a transparent original;
   an original table cover means for shielding the original table, said original table cover means having an image projection window and a lid member having one end being engaged with said original table cover and being adapted to cover or expose the image projection window, said lid member having a reflector on the inner surface thereof for reflecting the projected image toward the image focusing plane on the original table.

2. An image reading apparatus, comprising
   an original table provided with an image focusing plane for focusing thereon an image projected from a transparent original;
   an original table cover means for shielding the original table, said original table cover means having a light receiving window provided in said original table cover at a position corresponding to said image focusing plane;
   a light emitting window provided in said original table cover at a position through which the projected light from said transparent original passes;
   a pair of lid members each having respective ends movably attached to said light receiving window and said light emitting window at the respective side edge portions thereof most distant from each other;
   a pair of reflectors provided on the respective inner surfaces of said pair of lid members; and
   pairs of support members for supporting said pair of lid members with respect to said original table cover at angles of about 45 degrees between said respective reflectors and said original table.

3. An image reading apparatus, comprising:
   an original table provided with an image focusing plane for focusing thereon an image projected from a transparent original;
   an original table cover means for shielding the original table, said original table cover means having an image projection window and a lid member having one end engaged with said original table cover and adapted to cover or expose the image projection window, said lid member having a reflector on the inner surface thereof for reflecting the projected image toward the image focusing plane on the original table; and
   first support members, each having one end being engaged with said original table cover, the other end being movably attached to said lid member, said first support members supporting said lid member at an angle of about 45 degrees between said reflector and said image focusing plane on the original table.

4. The apparatus of claim 3, wherein said first support members are a pair of supports, each having one end being engaged with said original table cover on inner edges of both sides of said image projection window, the other end being movably attached to the lid member on both sides of said reflector.

5. The apparatus of claim 4, wherein said lid member has grooves on both sides of said reflector for receiving said first support members.

6. An image reading apparatus, comprising:
   an original table provided with an image focusing plane for focusing thereon an image projected from a transparent original;
   an original table cover means for shielding the original table, said original table cover means having an image projection window and a lid member having one end being engaged with said original table cover and being adapted to cover or expose the image projection window, said lid member having a reflector on the inner surface thereof for reflecting the projected image toward the image focusing plane on the original table; and p1 a rectangular protective member one end of which is movably attached to the unengaged end of said lid member, the other end being supported by second support members at a position parallel to said original table cover.

7. An image reading apparatus, comprising:
   an original table provided with an image focusing plane for focusing thereon an image projected from a transparent original;
   an original table cover means for shielding the original table;
   a reflector means provided on the original table cover; and
   a projector means for projecting an image toward the reflector means.

* * * * *